(12) United States Patent
Maly et al.

(10) Patent No.: US 6,405,775 B1
(45) Date of Patent: Jun. 18, 2002

(54) TIRE WITH TREAD OF RUBBER COMPOSITION CONTAINING SELECTIVE LOW MOLECULAR WEIGHT POLYESTER PLASTICIZER

(75) Inventors: Neil Arthur Maly, Tallmadge; Justin Joseph Fantozzi, Akron, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/589,424

(22) Filed: Jun. 7, 2000

(51) Int. Cl.$^7$ .................................................. B60C 1/00
(52) U.S. Cl. ........................ 152/564; 524/306; 524/311; 525/177
(58) Field of Search ................................. 524/311, 306; 525/177; 152/209.1, 564

(56) References Cited

U.S. PATENT DOCUMENTS

| | | | | |
|---|---|---|---|---|
| 4,737,535 A | * | 4/1988 | Furukawa | 524/113 |
| 5,284,906 A | | 2/1994 | Schulz et al. | 524/710 |
| 5,284,907 A | | 2/1994 | Schulz et al. | 524/710 |
| 5,967,211 A | * | 10/1999 | Lucas | 152/209.4 |

FOREIGN PATENT DOCUMENTS

| | | | | |
|---|---|---|---|---|
| EP | 0470042 | 2/1992 | | C08F/236/04 |

OTHER PUBLICATIONS

Great Britain Search Report.
"Esters for Industry" brochure published by The C. P. Hall Company, Chicago, Illinois, pp. 1–14.

* cited by examiner

Primary Examiner—Patricia A. Short
(74) Attorney, Agent, or Firm—Henry C. Young, Jr.

(57) ABSTRACT

This invention relates to a tire having a tread of a rubber composition which contains a low molecular weight polyester plasticizer.

6 Claims, No Drawings

TIRE WITH TREAD OF RUBBER COMPOSITION CONTAINING SELECTIVE LOW MOLECULAR WEIGHT POLYESTER PLASTICIZER

FIELD OF THE INVENTION

This invention relates to a tire having a tread of a rubber composition which contains a low molecular weight polyester plasticizer. Representative of various low molecular weight polyesters are, for example, polyester sebacate, triethylene glycol caprate-caprylate, triethylene glycol diheptanoate, triethylene glycol dipelargonate, triethylene glycol dipelargonate and triethylene glycol di-2-ethylhexoate.

BACKGROUND OF THE INVENTION

High performance tires typically have rubber treads for which their surfaces intended to be ground-contacting are also intended to exhibit relatively high traction characteristics.

Accordingly, it is conventionally desired that the tread rubber composition of such high performance tire be relatively soft as evidenced by a relatively low hardness value, and/or to provide relatively high traction for the tread rubber as being predictive by a relatively higher hysteresis for the rubber composition as evidenced by higher tan delta and J" physical properties.

In the description of this invention, the term "phr" is used to designate parts by weight of a material per 100 parts by weight of elastomer. In the further description, the terms "rubber" and "elastomer" may be used interchangeably unless otherwise mentioned. The terms "vulcanized" and "cured" may be used interchangeably, as well as "unvulcanized" or "uncured", unless otherwise indicated.

SUMMARY AND PRACTICE OF THE INVENTION

In accordance with this invention, a tire having a tread of a rubber composition comprised of, based upon 100 parts by weight of conjugated diene-based elastomer (phr), (A) 100 phr of at least one diene-based elastomer, and (B) about 1 to about 20, alternatively about 2 to about 15, phr of low molecular weight polyester selected from at least one of polyester sebacate having a molecular weight in a range of about 1000 to about 3000 so long as it has a melting point below 0° C., triethylene glycol caprate-caprylate having molecular weight of about 430 formula weight, triethylene glycol diheptanoate having a molecular weight of about 388 formula weight, triethylene glycol dipelargonate having a molecular weight of about 420 formula weight and triethylene glycol di-2-ethylhexoate having a molecular weight of about 374 formula weight, preferably the polyester sebacate and the triethylene glycol caprate-caprylate.

Representative of said polyester sebacate is, for example, as PLASTHALL P-1070 from CP Hall. (melt point of about −22° C.)

Representative of said triethylene glycol caprate-caprylate is, for example, PLASTHALL 4141 from C P Hall (melt point of about −5° C.).

Representative of said triethylene glycol diheptanoate is, for example, TegMeR 703 from C P Hall.

Representative of said triethylene glycol dipelargonate is, for example, TegMeR 903 from C P Hall.

Representative of said triethylene glycol di-2-ethylhexoate is, for example as TegMeR 803 from C P Hall Company.

The above molecular weights and indicated freeze (melt) points are values reported by the C P Hall Company.

A significant characteristic of the various triethylene glycol materials recited for use in this invention is that they have molecular weights being preferably below 750.

In practice, various conjugated diene-based elastomers may be used for the tire tread such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Representative of such conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers, styrene/isoprene copolymers and 3,4-polyisoprene.

A significant aspect of this invention appears to be, although the mechanism may not be entirely understood, that use of the low molecular weight polyester sebacate in a conjugated diene-based elastomer composition intended for use as a high performance tire tread has been observed to increase both a rubber composition's 300 percent modulus and its hysteresis.

A significant aspect of this invention appears to be, although the mechanism may not be entirely understood, that use of the low molecular weight triethylene glycol caprate-caprylate in a conjugated diene-based elastomer composition intended for use as a high performance tire tread has been observed to reduce the room temperature hardness and RPA G' 1% while maintaining the hysteretic properties and sometimes increasing the Strebler adhesion. As used herein the term "RPA" means rubber processing analyzer analytical equipment as produced by the Monsanto Company, and referred to as "RPA 2000". The term "RPA G' 1 percent" refers to the dynamic storage modulus "G'" at a one (1) percent strain (elongation) as determined by the RPA 2000 analytical equipment.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, plasticizers additives, such as oils and resins, fillers, pigments, fatty acid, zinc oxide, waxes, antioxidants and antiozonants and reinforcing materials such as, for example, carbon black, silica and clay. As known to those skilled in the art, depending on the intended use of the sulfur vulcanizable and sulfur vulcanized material (rubbers), the additives mentioned above are selected and commonly used in conventional amounts.

Typical amounts of processing oils, if used, comprise about 1 to about 50 phr. Such processing oils can include, for example, aromatic, napthenic, and/or paraffinic processing oils. Typical amounts of antioxidants comprise about 0.5 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 0 to 5 phr. Typical amounts of fatty acids, if used, which can include stearic acid comprise about 0.5 to about 3 phr. Typical amounts of zinc oxide comprise about 1 to about 10 phr. Typical amounts of waxes comprise about 0 to about 5 phr. Often microcrystalline waxes are used. The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The presence and relative amounts of the above additives are not considered to be an aspect of the present invention, unless otherwise indicated herein, which is more primarily directed to the utilization of low molecular weight polyesters in rubber compositions.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber and fillers such as carbon black and optional silica and coupler, and/or non-carbon black and non-silica fillers, are mixed in one or more non-productive mix stages. The terms "non-productive" and "productive" mix stages are well known to those having skill in the rubber mixing art.

The following examples are presented to illustrate the invention and are not intended to be limiting. The parts and percentages are by weight unless otherwise designated.

EXAMPLE 1

A rubber composition is prepared which is comprised of a styrene/butadiene copolymer elastomer prepared by emulsion polymerization (E-SBR) and 10 phr of mixed rubber processing oils and referred to herein as Control Sample A.

A similar rubber composition is prepared in which a low molecular weight polyester sebacate is used as a plasticizer instead of the 10 phr of mixed oils and is referred to herein as Sample B.

A similar rubber composition is prepared in which a low molecular weight triethylene glycol caprate-caprylate is used as a plasticizer instead of the mixed oils and is referred to herein as Sample C.

The elastomer compositions were prepared by blending the respective elastomer composition in an internal rubber mixer for about 2.5 minutes to a temperature of about 160 degrees C. (The non-productive mixing step)

The resulting elastomer composition was than mixed in an internal rubber mixer for about 2 minutes to a temperature of about 110 degrees C. during which the sulfur curatives were blended (the productive mixing step).

Samples A, B and C are illustrated in the following Table 1.

TABLE 1

| Material | Parts | | |
|---|---|---|---|
| | Sample A Control | Sample B | Sample C |
| Non-Productive Mixing Step | | | |
| E-SBR elastomer[1] | 137.5 | 137.5 | 137.5 |
| Carbon black[2] | 90 | 90 | 90 |
| Phenol/Formaldehyde resin[3] | 10 | 10 | 10 |
| Alkylphenol-acetylene resin[4] | 15 | 15 | 15 |
| Zinc oxide | 2 | 2 | 2 |
| Antioxidant[5] | 1 | 1 | 1 |
| Stearic acid | 1 | 1 | 1 |
| Mixed oils[6] | 10 | 0 | 0 |
| Polyester sebacate[7] | 0 | 10 | 0 |
| Triethylene glycol caprate-caprylate[8] | 0 | 0 | 10 |
| Productive Mixing Step | | | |
| Accelerator(s) | 2.7 | 2.7 | 2.7 |
| Sulfur | 1 | 1 | 1 |

[1]Styrene/butadiene rubber obtained from the Goodyear Tire & Rubber Company prepared by cold emulsion polymerization at 10° C. or lower and containing 40% styrene and 37.5 phr aromatic oil based upon the E-SBR (e.g. 137.5 parts by weight contains 100 parts by weight rubber hydrocarbon, or the E-SBR)
[2]N234 carbon black, an ASTM designation
[3]Formaldehyde/resorcinol resin having a softening point of 110° C. obtained as CRJ-418 from the Schenectady Chemical Company
[4]An alkylphenol-acetylene copolymer resin obtained as powdered Koresin from the BASF Wyandotte Chemical Corp.
[5]Polymerized 1,2-dihydro-2,2,4-trimethylquinoline which is also called AgeRite Resin D when obtained from Vanderbilt.
[6]Mixed oils as 5 phr naphthenic/paraffinic medium process oil obtained as Flexon 641 from Exxon Co. and 5 phr of highly aromatic staining process oil obtained as Sundex 8125 from Sun Oil Co.
[7]Plasticizer obtained as Plasthall P-1070 from the CP Hall Company reported as having an average molecular weight of about 2000, a saponification number of about 595 and a melt point reported to be −22° C.
[8]Pasticizer obtained as Plasthall 4141 from the CP Hall Company reported as having a reported average molecular weight of about 430, a saponification number of about 260 and a melt point reported to be −5° C.
[9]Sulfenamide and guanidine accelerators Various physical properties of the Samples of Table 1 were evaluated and reported in the following Table 2. The term "ATS" refers to Automatic Testing System analytical equipment. This equipment determined tensile/elongation/hardness for a rubber sample as well as its Zwick rebound and specific gravity. The term "Adhesion to self" refers to value for interfacial adhesion by pulling one compound away from another (both compounds being the same) at a right angle to the untorn test specimen with the two ends being pulled apart at a 180° C. angle to each other using an Instron machine. The area of contract was determined from placement of a Mylar sheet between the compounds during cure. A window in the Mylar allowed the two materials to come into contact with each other during curing and subsequent testing.

TABLE 2

|  | Parts | | |
| --- | --- | --- | --- |
| Properties | Sample A Control | Sample B | Sample C |
| Rheometer, 100 cpm at 150° C. | | | |
| T90 (minutes) | 13.2 | 15.5 | 12.5 |
| T25 (minutes) | 5.3 | 6 | 5.7 |
| ATS Tensile/Elongation/Modulus | | | |
| Ultimate tensile (MPa) | 14.5 | 15.7 | 14.5 |
| Ultimate elongation (%) | 609 | 598 | 612 |
| 300% modulus (MPa) | 5.4 | 6.3 | 5.3 |
| ATS Shore A Hardness | | | |
| 25° C. | 73.8 | 80 | 71.1 |
| 100° C. | 43.4 | 47.8 | 45.2 |
| ATS Zwick Rebound | | | |
| 25° C. | 11.8 | 13.4 | 12.2 |
| 100° C. | 32.8 | 34.4 | 35.4 |
| Zwick Rebound | | | |
| 65° C. | 21.4 | 21 | 24 |
| 95° C. | 30 | 31.8 | 33.4 |
| 120° C. | 35.6 | 34.8 | 38.4 |
| 150° C. | 41.4 | 43 | 43 |
| RPA Strain Sweep 100° C. at 11 Hz | | | |
| G' 1% strain | 1944.5 | 1641.7 | 1785.1 |
| G' 50% strain | 406 | 412.3 | 418.3 |
| Tan delta 1% strain | 0.295 | 0.385 | 0.289 |
| Tan delta 15% strain | 0.290 | 0.363 | 0.284 |
| Tan delta 50% strain | 0.254 | 0.300 | 0.252 |
| J" 15% strain | 0.434 | 0.546 | 0.430 |
| J" 50% strain | 0.587 | 0.668 | 0.567 |
| Adhesion to Self | | | |
| Average Load (Newtons) | 47.8 | 18.9 | 124.6 |

It can readily seen from Table 2 that polyester sebacate (Sample B) increased the 300% modulus of the rubber composition as compared to Control Sample A while also increasing its hysteresis. A measure of the increased hysteresis of the rubber composition of Sample B is shown by its increased RPA Tan Delta and J" as compared to Control Sample A.

This is considered herein to be significant because normally it would be expected that the 300% modulus of the rubber composition must be reduced to increase its hysteresis. Increased hysteresis generally indicative of increased traction for a tire with tread of such rubber composition.

It can also be readily be seen from Table 2 that the triethylene glycol caprate-caprylate (Sample C) increased the Adhesion to Self for the rubber composition of Sample C while reducing its hardness as compared to the rubber composition of the Control Sample A. Reductions in the compound hardness is evidenced by a reduced ATS Shore A hardness at 23° C. and the RPA G' 1% strain for the rubber composition of Sample C as compared by Control Sample A.

This is considered herein to be significant because increased Adhesion to Self is indicative of improved rubber composition splice durability and the reduced hardness is indicative of improved road traction for a tire with a tread of such rubber composition.

EXAMPLE 2

A rubber composition is prepared which is comprised of a styrene/butadiene copolymer elastomer prepared by emulsion polymerization (E-SBR) and 20 phr solution polymerization prepared cis1,4-polybutadiene rubber (PBD) and 10 phr of mixed oils and referred to herein as Control Sample D.

A similar rubber composition is prepared in which a low molecular weight polyester sebacate is used as a plasticizer instead of the 10 phr of mixed oils and is referred to herein as Sample E.

A similar rubber composition is prepared in which a low molecular weight triethylene glycol caprate-caprylate is used as a plasticizer instead of the mixed oils and is referred to herein as Sample F.

The elastomer compositions were prepared by blending the respective elastomer composition, in an internal rubber mixer, for about 2.5 minutes to a temperature of about 160 degrees C. (The non-productive mixing step.)

The resulting elastomer composition was than mixed in an internal rubber mixer for about 2 minutes to a temperature of about 110 degrees C. during which the sulfur curatives were blended (the productive mixing step).

Samples D, E and F are illustrated in the following Table 3.

TABLE 3

|  | Parts | | |
| --- | --- | --- | --- |
| Material | Sample D Control | Sample E | Sample F |
| Non-Productive Mixing Step | | | |
| E-SBR elastomer[1] | 110 | 110 | 110 |
| PBD elastomer[2] | 20 | 20 | 20 |
| Carbon black[3] | 90 | 90 | 90 |
| Phenol/Formaldehyde resin[4] | 10 | 10 | 10 |
| Alkylphenol-acetylene resin[5] | 15 | 15 | 15 |
| Zinc oxide | 2 | 2 | 2 |
| Antioxidant[6] | 1 | 1 | 1 |
| Stearic acid | 1 | 1 | 1 |
| Mixed oils[7] | 10 | 0 | 0 |
| Polyester sebacate[8] | 0 | 10 | 0 |
| Triethylene glycol caprate-caprylate[9] | 0 | 0 | 10 |
| Productive Mixing Step | | | |
| Accelerator(s)[10] | 2.7 | 2.7 | 2.7 |
| Sulfur | 1 | 1 | 1 |

[1]Styrene/butadiene rubber obtained from the Goodyear Tire & Rubber Company prepared by cold emulsion polymerization at 10° C. or lower and containing 40% styrene and 37.5 phr aromatic oil (137.5 phr contain 100 phr rubber hydrocarbon)
[2]Cis 1,4-polybutadiene rubber obtained as BUD1208 from The Goodyear Tire & Rubber Company
[3]N234 carbon black, an ASTM designation
[4]Formaldehyde/resorcinol resin having a softening point of 110° C. obtained as CRJ-418 from the Schenectady Chemical Company
[5]A alkylphenol-acetylene copolymer resin obtained as powdered Koresin from the BASF Wyandotte Chemical Corp.
[6]Polymerized 1,2-dihydro-2,2,4-trimethylquinoline which is also called AgeRite Resin D when obtained from Vanderbilt.
[7]Mixed oils as 5 phr naphthenic/paraffinic medium process oil obtained as Flexon 641 from Exxon Co. and 5 phr of highly aromatic staining process oil obtained as Sundex 8125 from Sun Oil Co.
[8]Plasticizer obtained as Plasthall P-1070 from the CP Hall Company having an average molecular weight of about 2000, a saponification number of about 595 and a melt point reported to be −22° C.
[9]Pasticizer obtained as Plasthall 4141 from the CP Hall Company reported as having a reported average molecular weight of about 430, a saponification number of about 260 and a melt point reported to be −5° C.
[10]Sulfenamide and guanidine accelerators Various physical properties of the Samples of Table 3 were evaluated and reported in the following Table 4.

TABLE 4

| Properties | Parts | | |
|---|---|---|---|
| | Sample D Control | Sample E | Sample F |
| Rheometer, 100 cpm at 150° C. | | | |
| T90 (minutes) | 12.2 | 13.3 | 11 |
| T25 (minutes) | 5.5 | 5.8 | 5.5 |
| ATS Tensile Elongation/Modulus | | | |
| Ultimate tensile (MPa) | 16.3 | 16.1 | 16.3 |
| Ultimate elongation (%) | 635 | 561 | 646 |
| 300% modulus (MPa) | 6.2 | 7.8 | 6 |
| ATS Shore A Hardness | | | |
| 25° C. | 77.8 | 80.8 | 74.2 |
| 100° C. | 49.9 | 52.6 | 48.8 |
| ATS Zwick Rebound | | | |
| 25° C. | 14.2 | 16.4 | 14.6 |
| 100° C. | 32.6 | 35.8 | 34.9 |
| Zwick Rebound | | | |
| 65° C. | 22.6 | 20.6 | 23.4 |
| 95° C. | 30.8 | 31 | 32.6 |
| 120° C. | 34 | 33.6 | 38 |
| 150° C. | 41.6 | 42 | 43.2 |
| RPA Strain Sweep 100° C. at 11 Hz | | | |
| G' 1% strain | 2300.5 | 2449.2 | 2109.2 |
| G' 50% strain | 517.2 | 548 | 496.7 |
| Tan delta 1% strain | 0.298 | 0.338 | 0.295 |
| Tan delta 15% strain | 0.274 | 0.385 | 0.287 |
| Tan delta 50% strain | 0.239 | 0.316 | 0.258 |
| J" 15% strain | 0.330 | 0.428 | 0.363 |
| J" 50% strain | 0.437 | 0.525 | 0.487 |
| Adhesion to Self | | | |
| Average Load (Newtons) | 157 | 9 | 156.3 |

It can readily seen from Table 4 that the polyester sebacate (Sample E) increased the 300% modulus of the rubber composition of Sample E, while also increasing its hysteresis, as compared to the rubber composition of Control Sample D. A measure of the increased hysteresis is shown by increased RPA Tan Delta and J" for the rubber position of Sample E as compared to the rubber composition of Control Sample D.

This is considered herein to be significant because normally it is expected that the 300% modulus of the rubber composition must be reduced to increase its hysteresis. Increased hysteresis generally indicative of increased traction for a tire with tread of such rubber composition.

It can also be readily be seen from Table 4 that the triethylene glycol caprate-caprylate (Sample F) maintained the very high Adhesion to Self while reducing the compound hardness for the rubber composition of Sample F as compared to the rubber composition of Control Sample D. Reductions in the hardness for the rubber composition of Sample F can be seen in reduced ATS Shore A 25° C. hardness and RPA G' 1% strain as compared to the rubber composition of Control Sample D.

This is considered herein to be significant because the reduced hardness is indicative of improved road traction for a tire with a tread of such rubber composition when other properties can be maintained.

What is claimed is:

1. A tire having a tread of a rubber composition comprised of, based upon 100 parts of conjugated diene-based elastomer (phr), (A) 100 phr of at least one diene-based elastomer, (B) about 1 to about 20 phr of low molecular weight polyester sebacate having a molecular weight in a range of about 1000 to about 3000 so long as it has a melting point below 0° C.

2. The tire of claim 1 wherein said polyester sebacate has a saponification number of about 455, a melt point of about −22° C. and a molecular weight of about 2000.

3. The tire of claim 2 wherein said diene-based elastomer is selected from at least one of homopolymers and copolymers of monomers selected from isoprene and 1,3-butadiene and copolymers of at least one diene selected from isoprene and 1,3-butadiene and styrene.

4. The tire of claim 2 wherein said diene-based elastomer is selected from at least one of cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers and styrene/isoprene/butadiene terpolymers.

5. The tire of claim 1 wherein said diene-based elastomer is selected from at least one of homopolymers and copolymers of monomers selected from isoprene and 1,3-butadiene and copolymers of at least one diene selected from isoprene and 1,3-butadiene and a vinyl aromatic compound selected from at least one of styrene and alphamethyl styrene.

6. The tire of claim 1 wherein said diene-based elastomer is selected from at least one of cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers and styrene/isoprene/butadiene terpolymers.

* * * * *